UNITED STATES PATENT OFFICE.

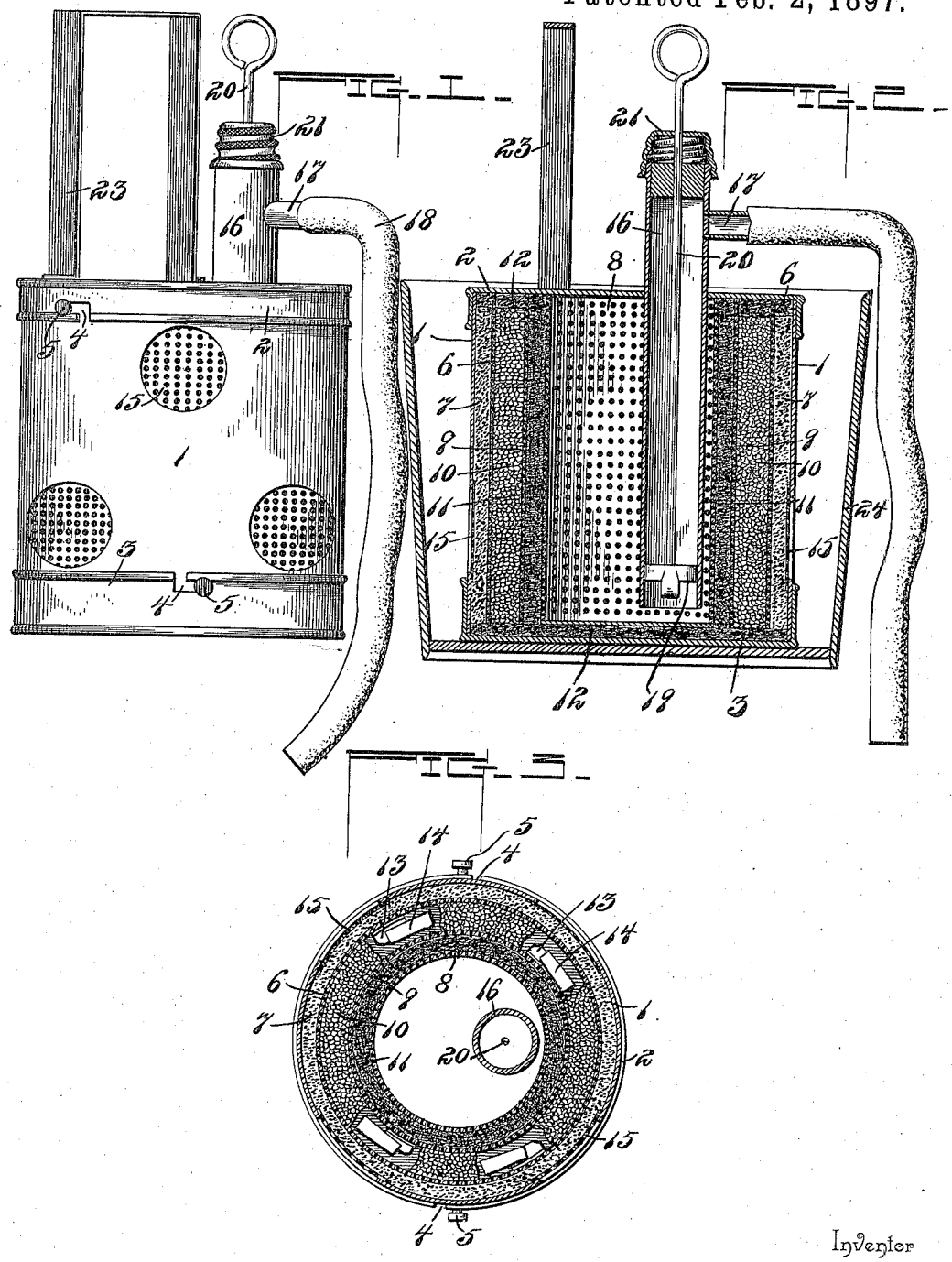

JOHN W. HART, OF GUTHRIE, OKLAHOMA TERRITORY, ASSIGNOR TO JOHN McBRINE AND FRANK W. HEWIT, OF SAME PLACE.

WATER-FILTER.

SPECIFICATION forming part of Letters Patent No. 576,452, dated February 2, 1897.

Application filed August 12, 1896. Serial No. 602,545. (No model.)

*To all whom it may concern:*

Be it known that I, JOHN W. HART, a citizen of the United States, residing at Guthrie, in the county of Logan and Territory of Oklahoma, have invented a new and useful Water-Filter, of which the following is a specification.

My invention relates to water-filters, and particularly to a device adapted to be arranged in a receptacle, such as a bucket or its equivalent, for filtering water as it is drawn from said receptacle; and the object in view is to provide a simple and efficient construction and arrangement of filtering mediums.

Further objects and advantages of this invention will appear in the following description, and the novel features thereof will be particularly pointed out in the appended claims.

In the drawings, Figure 1 is a side view of a filtering apparatus constructed in accordance with my invention. Fig. 2 is a central sectional view of the same, showing the filter arranged in a receptacle. Fig. 3 is an inverted horizontal section.

Similar numerals of reference indicate corresponding parts in all the figures of the drawings.

1 designates an exterior cylindrical shell or casing provided with removable top and bottom caps 2 and 3, which are preferably fitted exteriorly over the extremities of the body portion of the shell or casing and are secured in place by means of bayonet-slots 4, engaging headed studs 5. Arranged concentrically within the shell or casing is a reticulated outer wall 6, between which and the shell or casing is arranged a filtering medium 7, such as charcoal or its equivalent. Arranged at the center of and concentric with the shell or casing is a filtered-water chamber 8, having a closed bottom and reticulated walls, and spaced from and surrounding said chamber is a reticulated inner wall 9. Between the inner and outer walls 6 and 9 is arranged loose filtering material, such as fine gravel 10 or its equivalent, and between the inner wall and the exterior surface of the filtered-water chamber is disposed a layer of filtering material, such as absorbent cotton 11. Absorbent-cotton packing 12 is also arranged between the cap and the upper edges of the inner and outer walls and the under surface of the cap and also between the lower edges of said walls and the lower cap.

The inner and outer walls are detachably secured to the top cap by means of lateral ears 13, engaging open-sided clips or keepers 14, while the wall of the filtered-water chamber is preferably secured permanently to the under side of the cap, said detachability of the inner and outer walls being designed to facilitate the cleansing of the apparatus and the renewal of filtering material. The exterior shell or casing is preferably provided with a plurality of inlet-openings 15, fitted with wire-gauze or similar reticulated material.

Extending vertically through the cap-plate and terminating contiguous to the bottom of and within the filtered-water chamber is a lifting tube or barrel 16, provided contiguous to its upper end with a lateral outlet 17, to which is adapted to be attached a flexible discharge-pipe, such as rubber hose 18, and mounted for reciprocation in the lifting tube or barrel is a plunger 19, fitted with a stem 20, which extends through a removable cap 21, fitted upon the upper exposed end of the lifting tube or barrel. Said cap is also provided with a bail or handle 23, adapted to be grasped by the left hand of the operator during the elevation of the plunger, as hereinafter explained.

In operation the filtering device constructed in accordance with my invention is arranged in a receptacle, such as a bucket, (illustrated at 24,) with the discharge-tube extending to the outside of and depending to a point at or below the bottom of the receptacle, and when it is desired to induce a flow of water through the apparatus after the latter has remained in the water a sufficient length of time to saturate the contained filtering mediums the plunger is drawn upwardly until it reaches a point above the lateral outlet of the lifting tube or barrel. Suction causes the lifting of the water in the barrel and the subsequent flow thereof through the discharge-tube, after which siphonic action maintains a constant flow through said tube until checked by the depression of the plunger. Thus in order to start the flow of liquid through the apparatus it is simply necessary to raise the plunger once to the top of the barrel and leave it at that point, and when it is desired to check said flow it is simply necessary to depress the plunger to a point below the plane of the outlet, which is located near the upper end of the barrel.

It will be understood that various changes in the form, proportion, and the minor details of construction may be resorted to without departing from the spirit or sacrificing any of the advantages of this invention.

Having described my invention, what I claim is—

1. A filtering apparatus having an interiorly accessible shell or casing, inner and outer concentric walls arranged at intervals, a filtered-water chamber arranged within and concentric with the inner wall, filtering mediums interposed between said walls and between the shell and filtered-water chamber and said walls, and means for withdrawing the contents of the chamber, said inner and outer walls and the body portion of the shell or casing being detachably secured to the top or cover of said shell or casing, to provide for exposing the spaces between the parts or members of the apparatus, substantially as specified.

2. A filtering apparatus having an exterior shell or casing comprising a cylindrical body portion and top and bottom caps connected by bayonet-joints with said cylindrical body portion, a concentric inclosed filtered-water chamber secured to and carried by the top cap, inner and outer walls interposed between the filtered-water chamber and the shell or casing and provided at their upper edges with lateral ears engaging open-sided clips or keepers on the under surface of the top cap, whereby the engagement and disengagement of said cap with the inner and outer walls are accomplished by rotary movement thereof, a bail or handle rising from the top cap to facilitate the submersion of the shell or casing in a receptacle, and a siphon having one leg arranged within the filtered-water chamber, substantially as specified.

In testimony that I claim the foregoing as my own I have hereto affixed my signature in the presence of two witnesses.

JOHN W. HART.

Witnesses:
  W. A. BROWN,
  P. W. KOONS.